United States Patent [19]

Jager

[11] 4,345,865
[45] Aug. 24, 1982

[54] STACK STARTER

[76] Inventor: Joseph E. Jager, 44022 N. 75th St. East, Lancaster, Calif. 93534

[21] Appl. No.: 206,718

[22] Filed: Nov. 5, 1980

Related U.S. Application Data

[63] Continuation of Ser. No. 34,470, Apr. 30, 1979, abandoned.

[51] Int. Cl.³ .............................................. B60P 1/04
[52] U.S. Cl. ...................................... 414/35; 414/28; 414/38
[58] Field of Search ................... 414/38, 39, 534, 482, 414/469, 754, 35, 28, 97; 280/47.13 R, 47.16; 254/3 C; 211/49 R, 64, 63, 58, 168-170

[56] References Cited

U.S. PATENT DOCUMENTS

| | | | |
|---|---|---|---|
| 1,719,197 | 7/1929 | Schlothan | 414/38 |
| 1,977,497 | 10/1934 | Springer | 414/38 |
| 2,058,397 | 10/1936 | Baker | 414/38 |
| 3,357,580 | 12/1967 | Schettler et al. | 414/482 |
| 3,790,013 | 2/1974 | Smith | 414/469 |

Primary Examiner—Joseph J. Rolla
Assistant Examiner—Kenneth Noland
Attorney, Agent, or Firm—Edward C. Walsh

[57] ABSTRACT

An implement which is a stack starter. A wheeled chassis is provided and mounted on it is a stack starting frame which can be moved between a horizontal position and a vertical position to provide an upright against which a stack of hay bales can be started. The frame is in a horizontal position for transportation and can be latched in a vertical position for use to start the stack. The bales of hay are loaded on a flat bed wagon or truck by a loading machine. The flat wagon has prongs or rakes at one end. To start a stack the bed of the wagon is moved to a vertical position with the prongs or rakes underneath the stack with the bales up against the starting frame. The wagon is then backed away from the stack. The stack is started, that is held in that position by the stack starting frame. The next load is loaded up against the first which is against the starting frame.

1 Claim, 4 Drawing Figures

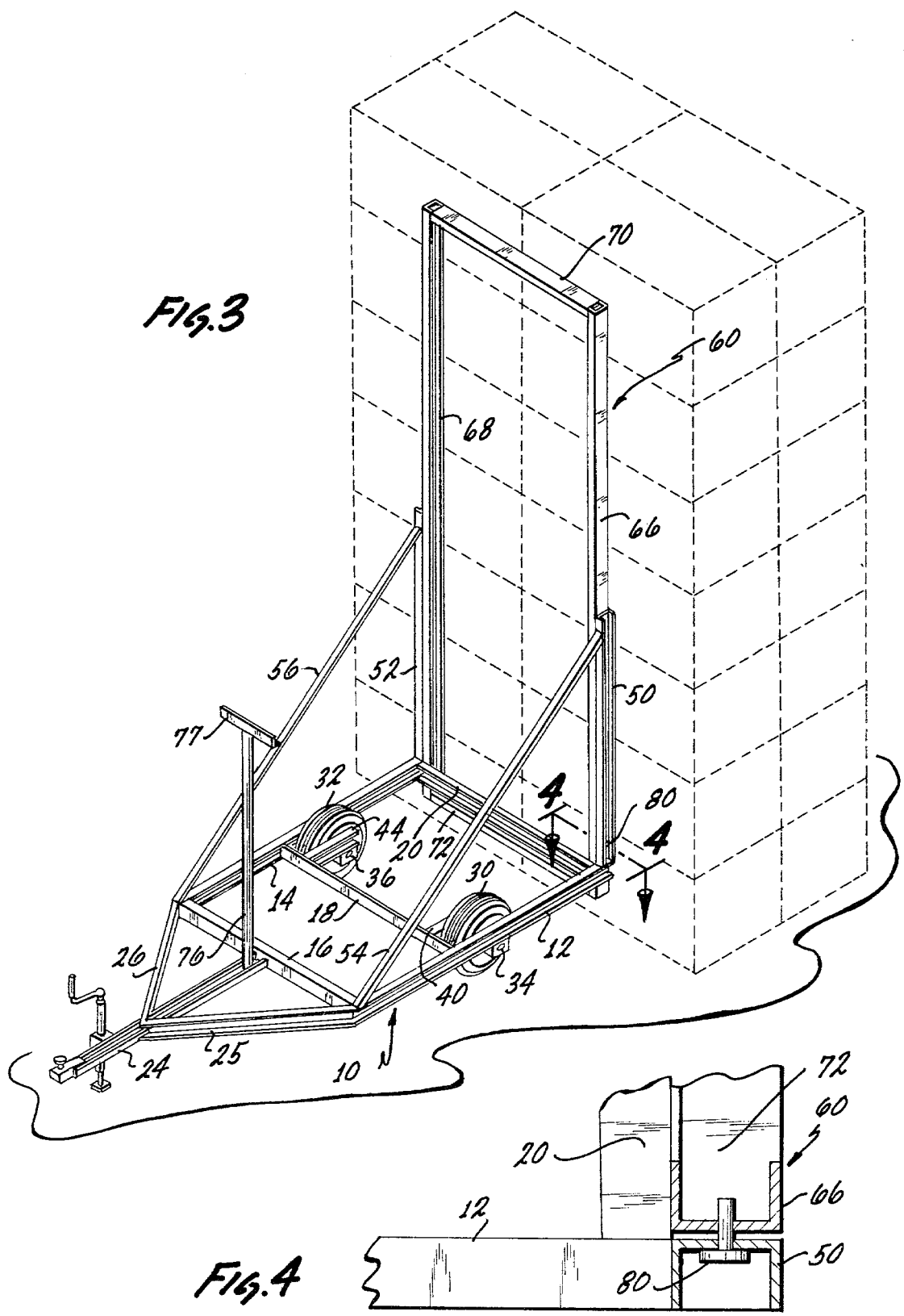

STACK STARTER

This is a continuation of application Ser. No. 34,470 filed on Apr. 30, 1979, now abandoned.

SUMMARY OF THE INVENTION

1. Field of the Invention

The field of the invention is that of farm implements and more particularly an implement which is a stack starter for use in starting stacks of baled hay and the like as described in more detail hereinafter.

2. Description of the Prior Art

Reference is made to the following U.S. Pat. Nos. 2,166,918; 3,297,175; 3,307,716; 3,367,094; and 4,047,628.

The prior art does not provide an implement specifically or particularly adapted for purposes of starting a stack of hay bales or the like in haying or hay harvesting operations. The prior art lacks teaching of an implement having the particular desired characteristics as described in detail hereinafter which fulfills a particular need in the art.

SUMMARY OF THE INVENTION

In haying or hay harvesting operations, typically the hay is baled and the bales are loaded onto a wagon or truck by a loading implement. Typically the wagon or truck has a flat bed with prongs or rakes at one end of it and onto which the bales are loaded 4 high and 8 long along the length of the wagon.

A stack of bales is started by way of the bed of the wagon being move hydraulically to a vertical position with the rakes underneath the stack which was the load of bales. Then the wagon is backed away from the stack and the rakes are pulled out from underneath the stack. What can happen is that the rake on one side may pull out sooner than the rake on the other side twisting the stack and causing it to topple over. If that happens all the bales have to be reloaded by hand and the stack started over again.

If the stack does not topple over, the next load is loaded up against it so a long or elongated stack is provided.

The herein invention provides a stack starter which avoids the problem described in the foregoing. The stack starter is an implement having a wheeled chassis for transportation. Mounted on it is a frame carried by uprights, the frame being movable from a horizontal position, which is a position for transportation into a vertical position wherein it forms a vertical structure adapted to have bales placed against it for starting the stack. The frame can be latched or locked in the vertical position while in use for starting a stack. Thus, when the frame is in position for stacking, the first load from the wagon is loaded against it and held so that it cannot topple over. the result is that a stack can be started without difficulty and a uniform, elongated and firm stack can readily be realized.

In the light of the foregoing the primary object of the invention is to make available an improved implement which is a stack starter particularly adapted for starting stacks of baled material especially baled hay.

A further object is to realize the foregoing by way of an implement having a wheeled chassis carrying an adjustable starting frame on uprights which can be moved between a horizontal position for transportation and a vertical position for utilization as a stack starter.

Further object and advantages of the invention will become apparent from the following detailed description and annex drawing.

BRIEF DESCRIPTION OF THE DRAWINGS

FIG. 3 is an isometric view of the invention illustrating its utilization;

FIG. 4 is a detail sectional view taken along line 4—4 of FIG. 3.

Figure 1:
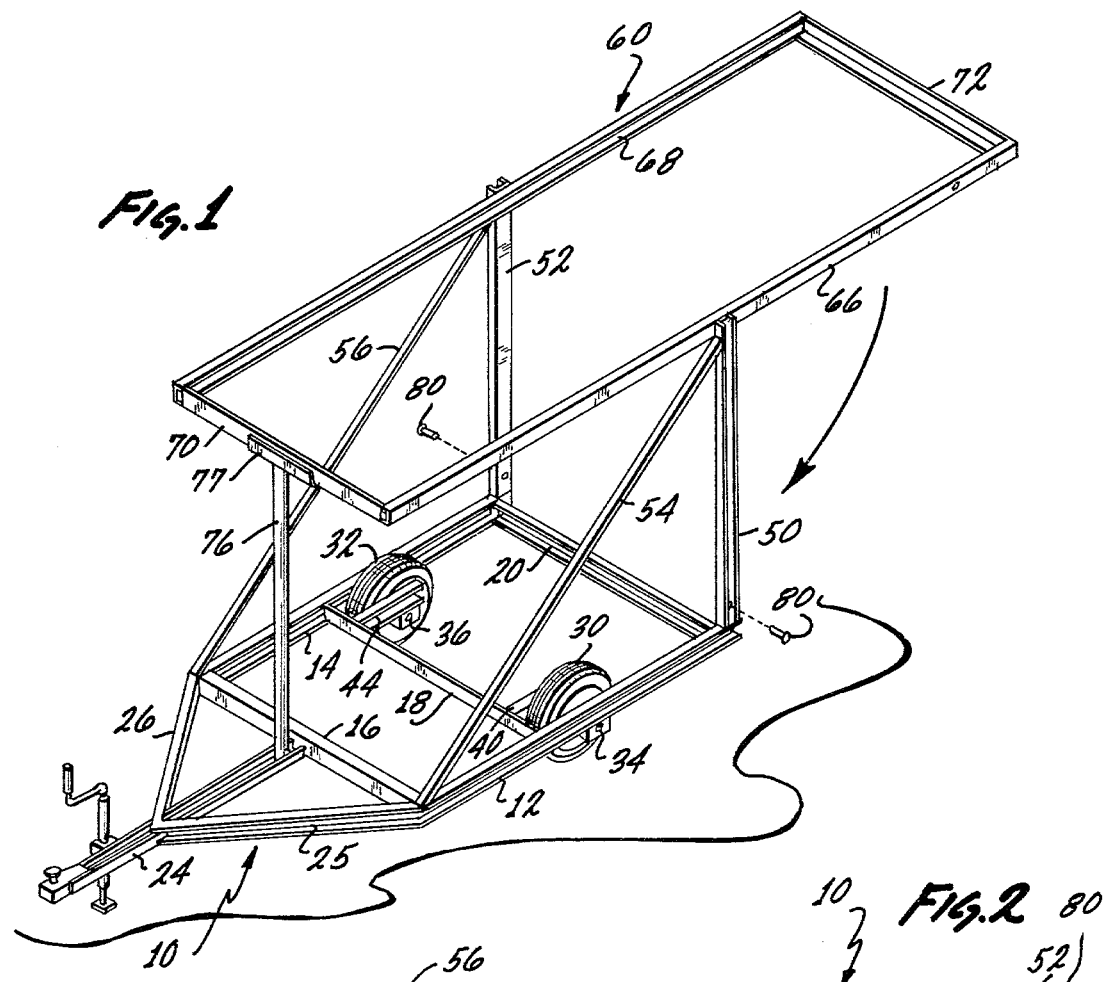
FIG. 1 is a pictorial view of the preferred form of the invention.
Figure 2:
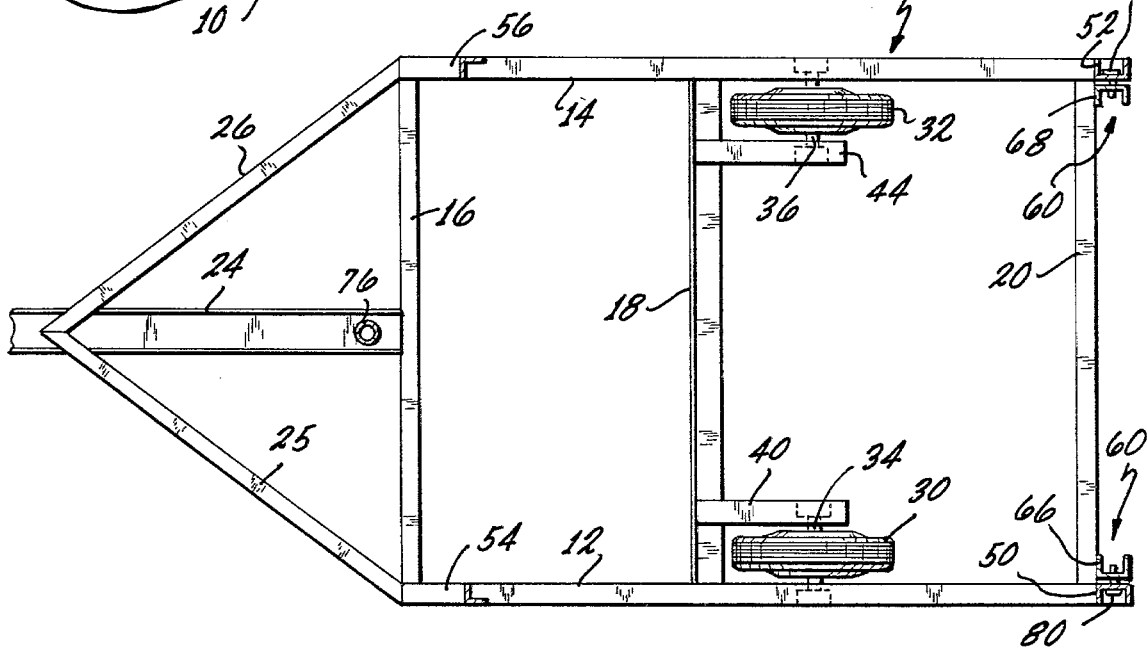
FIG. 2 is a pian view of the chassis of the implement.

BRIEF DESCRIPTION OF THE PREFERRED EMBODIMENT AND MODE OF PRACTICE OF THE INVENTION

Referring to the various figures of the drawing the chassis is designated by the numeral 10. It includes fore and aft members 12 and 14 which constitute part of the frame of the chassis. Numerals 16, 18 and 20, designate transverse frame members extending between the longitudinal members 12 and 14. Numeral 24 designates a tongue by which the implement may be towed behind a tractor or the like. Numerals 25 and 26 designate diagonal brace members positioned between the transverse member 16 and the tongue 24. The frame members can be angle members or channel members. Numeral 26 designates a screw jack member carried by the tongue 24 for use when the implement is parked.

Numerals 30 and 32 designate the pair of wheels on which the implement is supported providing for transportability of the implement. The wheels are journaled on axles as designated at 34 and 36. Numeral 40 designates a support member extending from the transverse member 18, the axel 34 being carried between the end of this member and the longitudinal member 12. Numeral 44 designates a similar member extending from the transverse member 18 the axel 36 being carried between the end of ths member and the longitudinal member 14.

Upstanding from the longitudinal members 12 and 14 of the chassis frame are vertical uprights 50 and 52. Numerals 54 and 56 designate diagonal brace members one of them extending between the longitudinal member 12 and the upper end of the upright 50 and the other extending between the longitudinal frame member 14 and the upright 52.

Numeral 60 designates a rectangular frame which is the stack starting frame. As shown in the figures it includes a pair of longitudinal side members 66 and 68 with transverse members 70 and 72 extending between the longitudinal members. This frame, like the chassis can be of suitable construction of steel channel members or the like which are secured together by welding, riveting, or otherwise.

The frame 60 is carried by the uprights 50 and 52 and has pivotal mounting whereby it can be moved between a horizontal position suitable for transportation or a vertical position for stacking.

FIG. 1 shows the frame 60 in position for transportation. Upstanding from the tongue 24 is a vertical upright or post 76 having angle bracket 77 at its upper end on which the end of the frame 60 can be seated or carried for purposes transportability of the implement. The pivots for the frame 60 are at the upper ends of uprights 50 and 52.

In use the stacking frame 60 can be swung into a vertical position as illustrated in FIG. 3. In this position one end of the frame comes down into a position adjacent to the rear end of the chassis and it can be locked or latched in this position by way of latch bolts as shown at 80 in FIG. 4.

From the foregoing those skilled in the art will readily understand the nature of the construction and the manner of utilization of the implement. The implement can be towed to a desired position at which it is desired to start a stack. The stacking frame 60 is then moved into a vertical position as illustrated in FIG. 3 and is latched so as to be held in that position while being used. As described in the foregoing a load of bales can then be moved up to a position adjacent to the stacking frame and unloaded from the wagon bed when the load of bales positioned against the stacking frame 60. With the bales up against the stacking frame the rakes on the wagon bed can be withdrawn and underneath the bales without causing them to topple over so that a stack is started in a firm and stable way. The next load of bales can then be loaded against the ones already stacked so that an elongated but firm stack can readily be realized.

From the foregoing those skilled in the art will readily understand the nature and construction of the invention, its manner of utilization and the manner in which it achieves and realizes the objects as set forth in the foregoing.

The foregoing disclosure is representative of a preferred form of the invention and is to be interpreted in an illustrative rather than a limiting sense, the invention to be accorded the full scope of the claims appended hereto.

I claim:

1. An implement for starting and stabilizing stacked bales of hay on the surface of the ground, stacked by tilting from a transport vehicle comprising:

a wheel-supported frame said frame having a pair of horizontally extending parallel side members, a transverse end member connected to and extending between the inner sides of the parallel side members and spaced inwardly from the respective ends of the side members and a pair of vertically upstanding members extending upwardly from the upper end surfaces of the parallel side members;

a rectangular frame having parallel side elements pivotally mounted intermediate its ends to and between the upper free ends of said upstanding members for pivotal movement from a horizontal position to a vertical position, said rectangular frame when in said vertical position having its said side elements positioned between the said ends of the said side members of the wheel supported frame and against said transverse end member, said rectangular frame, when in said vertical position, defining a planar vertical surface free of lateral projections; said rectangular frame when in vertical position extending substantially to the ground;

means for selectively locking said rectangular frame in said vertical position to said vertically extending members adjacent the ends of the side members whereby said rectangular frame is in a fixed position and serves to engage and stabilize the vertical side of a stack of bales opposite a transport vehicle from which said bales are tilted to thereby stabilize said stack against tilting or collapsing away from said vehicle, the implement including the frame being movable away from stack leaving it standing, said wheel—supported frame is provided with an upright member, located at the other end of said frame from said upstanding members, for engaging and supporting said rectangular frame in a horizontal position for transporting said implement.

* * * * *